United States Patent
Reis et al.

[11] Patent Number: 5,460,067
[45] Date of Patent: Oct. 24, 1995

[54] CONTINUOUS CYCLE MECHANICAL ARCHITECTURE ABLE TO SIMULTANEOUSLY BLOCK AND CUT LAYERS OF ANY NON-RIGID MATERIALS

[76] Inventors: Gianluigi Reis, Via Vettabbia, 6-20122 Milan, Italy; Giorgio Massocco, Salita Sant'Anna, 97-15033 Casal Monferrato, Italy

[21] Appl. No.: 867,099
[22] PCT Filed: Oct. 21, 1991
[86] PCT No.: PCT/IT91/00087
  § 371 Date: Jun. 22, 1992
  § 102(e) Date: Jun. 22, 1992
[87] PCT Pub. No.: WO92/06830
  PCT Pub. Date: Apr. 30, 1992

[30] Foreign Application Priority Data

Oct. 22, 1990 [IT] Italy ......................... 314A/90

[51] Int. Cl.⁶ ......................... B26D 1/09; B26D 7/02
[52] U.S. Cl. ......................... 83/19; 83/137; 83/138; 83/142; 83/176; 83/390; 83/628; 83/635
[58] Field of Search ......................... 83/137, 138–143, 83/176, 385, 386, 387, 390, 628, 635, 175, 176, 19

[56] References Cited

U.S. PATENT DOCUMENTS

| | | | |
|---|---|---|---|
| 1,372,221 | 3/1921 | Dutro et al. | 83/384 |
| 3,902,954 | 9/1975 | Lotto | 83/175 |
| 4,262,569 | 4/1981 | Yoshieda et al. | 83/386 |
| 4,358,979 | 11/1982 | Kurzbuch | 83/140 |
| 5,005,456 | 4/1991 | Ballard et al. | 83/176 |

FOREIGN PATENT DOCUMENTS

| | | | |
|---|---|---|---|
| 1239729 | 7/1960 | France . | |
| 2407438 | 8/1975 | Germany | 83/628 |
| 3534467 | 7/1986 | Germany . | |

*Primary Examiner*—Hien H. Phan
*Attorney, Agent, or Firm*—Allegretti & Witcoff, Ltd.

[57] ABSTRACT

A device for performing the continuous cutting of materials of any form and nature, provided they are stratified and not flexionally rigid. The device generally comprises: fixed and mobile support surfaces; a mobile cutting shear cooperating with a fixed cutting shear; a fixed blocking unit on the fixed support surface side of the cutting shears; a mobile blocking unit on the mobile support surface side of the cutting shears; an eccentric for driving mobile portions of the device, including the mobile cutting shear, the eccentric being synchronized with the fixed and mobile blocking units; and a link block and slide guide. Non-rigid, stratified materials thereby may be more easily cut in that the invention substantially reduces or eliminates the dragging effect of the material that typically occurs during the cutting process.

4 Claims, 1 Drawing Sheet

CONTINUOUS CYCLE MECHANICAL ARCHITECTURE ABLE TO SIMULTANEOUSLY BLOCK AND CUT LAYERS OF ANY NON-RIGID MATERIALS

FIELD OF THE INVENTION

The present invention refers to a mechanism which can resolve the problems inherent in cutting of non-rigid layered materials and, specifically, in those cases in which the cutting is dependent on a perfect blocking of the material itself, both before and after the cutting section.

In fact, for such types of materials, the cutting can be carried out only if the horizontal dragging due to the impact of the mobile cutting device on the material itself is prevented.

The architecture in question, which uses suitable blocking units to compress, and hence avoid the dragging due to the friction induced by the compression itself, resolves this problem.

BRIEF DESCRIPTION OF THE DRAWING

The main components of the architecture are shown in FIG. 1.

DESCRIPTION OF THE PREFERRED EMBODIMENT

Figure 1:
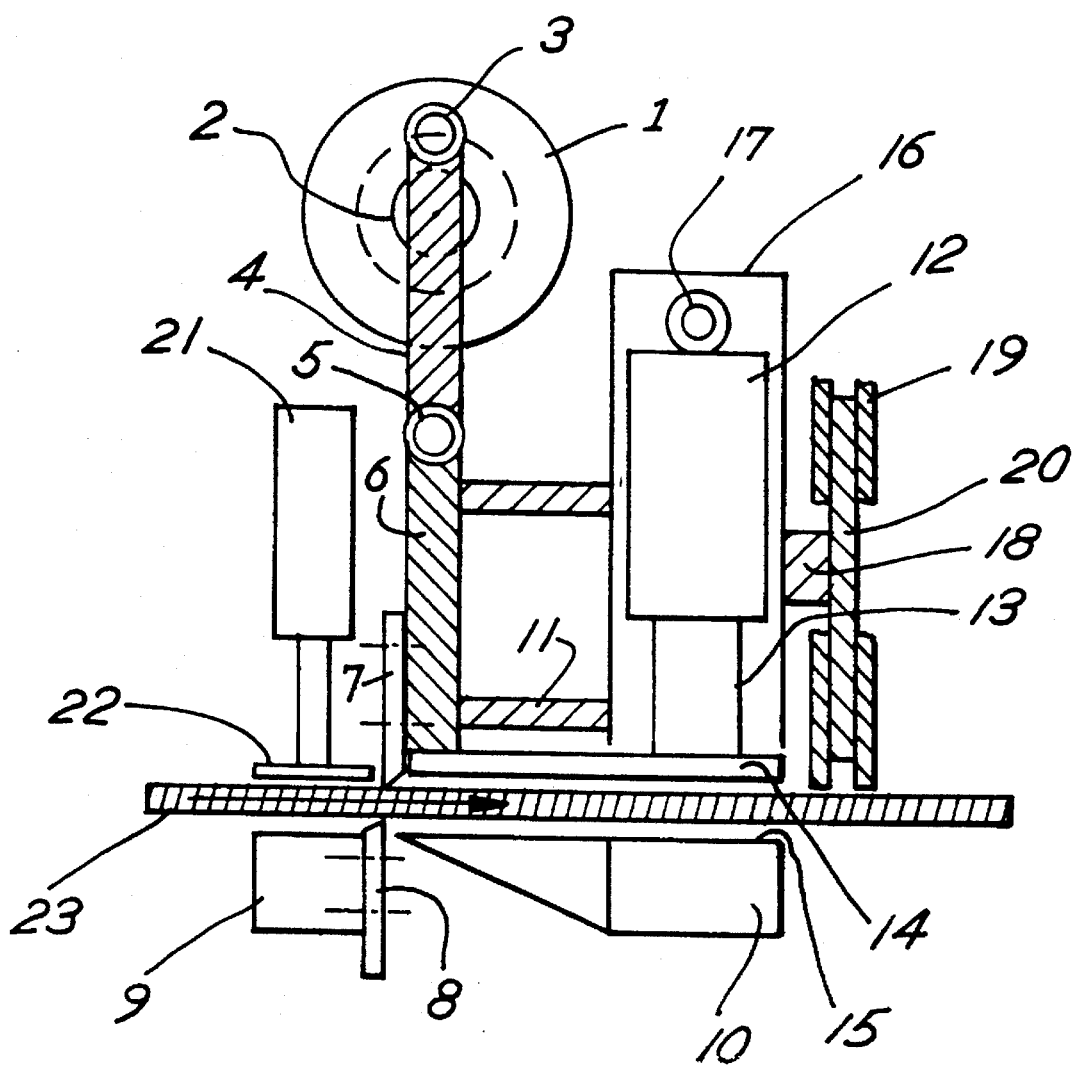

The functional principle of the architecture is based on the following logical sequence:
1. The advance of the material to be cut to the mobile support surface 15;
2. The blocking both after and before the fixed 8 and mobile 7 shears by the blocking units 21 and 12, respectively, on the support surfaces 9 and 15;
3. The cutting of the blocked material by the vertical movement of the mobile shear 7 connected to the mobile group constituted by elements 6, 11, 13, 14, 16, 18, and 20.

Mobile wall 6 is controlled by an eccentric 1 and crank components 3, 4 and 5.

In addition, the mobile support structure 16 houses internally the blocking unit 12, which is linked to casing 16 by the pin 17.

Proper movement of the entire mobile group 6, 11, 13, 14, 16, 18 and 20 is ensured by the special slide guides 19 on which link block 20 is guided;
4. Return of the eccentric 1 to the "upper dead position" and resetting of the mobile support surface 15 with the consequent realignment of all the mobile components, and the apparatus thereby prepared for additional cutting.

This logical sequence can be automated to function with a continuous cycle synchronized between its various elements.

The architecture is mainly realized in metallic material and installed in a suitable robust and reliable structure, which is also metallic, complete with all the accessories, alarms and safety devices.

The description above does not indicate in detail the mechanism of the motor unit, as well as those of the ancillary functions, such as the guide, joints, transmission, etc., since they are of no relevance and secondary for the purposes of describing the functioning of the architecture which is the subject of the present invention.

It is obvious that the invention is not limited to the form of execution described and illustrated, but that numerous variations and further perfections can be made without prejudice to the flamework of the invention.

The following reference numerals identify the various components of the preferred embodiment of the present invention, as shown in FIG. 1 of the drawing:
1. Eccentric
2. Eccentric rotation control shaft
3. Pin linking the crank 4 to the eccentric 1
4. Crank linking the eccentric 1 with the mobile wall 6
5. Pin linking the crank 4 with the mobile wall 6
6. Mobile wall
7. Mobile shear
8. Fixed shear
9. Fixed support surface
10. Vertical mobile gathering support, which is linked with the mobile structure associated with the mobile shear 7
11. Mobile link support 6, which links mobile wall 6 with mobile support structure 16
12. Mobile blocking unit
13. Vertical mobile compression surface support link
14. Moveable compression surface of mobile blocking unit 12
15. Mobile support surface
16. Mobile support structure
17. Pin linking mobile blocking unit 12 with mobile support structure 16
18. Link block support, which connects link block 20 with mobile support structure 16
19. Slide guide for link block 20
20. Link block
21 Fixed blocking unit
22 Moveable compression surface of fixed blocking unit 21

We claim:

1. A method for simultaneously blocking and cutting at least one layer of non-rigid material having at least a first side and a second side, comprising the steps of:

placing a first side of said non-rigid material to be cut on a fixed support surface and a mobile support surface;

engaging a first portion of said second side of said non-rigid material with a fixed blocking unit to compress said non-rigid material on said fixed support surface whereby said non-rigid material is substantially secured in place on said fixed support surface;

engaging a second portion of said second side of said non-rigid material with a mobile blocking unit to compress said non-rigid material on said mobile support surface whereby said non-rigid material is substantially secured in place on said mobile support surface; and moving simultaneously a mobile wall, a mobile shear connected to said mobile wall a link block, said mobile support surface and a mobile support structure connected intermediate said mobile wall and said link block, in a substantially uniform direction such that said mobile shear cooperates with a fixed shear connected to said fixed support surface to cut said non-rigid material between said first and second portions of said non-rigid material, said mobile blocking unit being connected to a housed within said mobile support structure: and guiding movement of said mobile wall said mobile shear said mobile support surface, and said mobile support structure in said substantially uniform direction through cooperation of said link block with a slide guide.

2. A method for simultaneously blocking and cutting at least one layer of non-rigid material having at least a first side and a second side as in claim 11, including the step of moving said mobile wall, said mobile support structure, said mobile blocking unit and said mobile support surface with an eccentric.

3. A mechanical apparatus capable of simultaneously blocking and cutting at least one layer of non-rigid material having at least a first side and a second side, said apparatus comprising:

a mobile wall;

a link block;

a mobile support structure connected intermediate said mobile wall and said link block;

a fixed support surface to contact said first side of said non-rigid material;

a mobile support surface to contact said first side of said non-rigid material;

a fixed blocking unit positioned to cooperate with said fixed support surface to engage a first portion of said second side of said non-rigid material and to compress said non-rigid material on said fixed support surface whereby said non-rigid material is substantially secured in place on said fixed support surface;

a mobile blocking unit connected to and housed within said mobile support structure, said mobile blocking unit positioned to cooperate with said mobile support surface to engage a second portion of said second side of said non-rigid material and to compress said non-rigid material on said mobile support surface whereby said non-rigid material is substantially secured in place on said mobile support surface;

a slide guide to cooperate with said link block to limit movement of said mobile wall, said mobile support structure, and said mobile blocking unit to a substantially uniform direction:

a fixed shear connected to said fixed support surface; and a mobile shear connected to said mobile wall and positioned to cooperate with said fixed shear in cutting said non-rigid material between said first and second portions of said non-rigid material during a cutting cycle of said apparatus.

4. A mechanical apparatus capable of simultaneously blocking and cutting at least one layer of non-rigid material as in claim 3, including an eccentric operatively connected to said mobile wall for controlling said cutting cycle of said apparatus.

* * * * *